No. 862,109. PATENTED JULY 30, 1907.
E. B. ROTH.
DEVICE FOR POSITIONING ROLLS.
APPLICATION FILED AUG. 10, 1906.
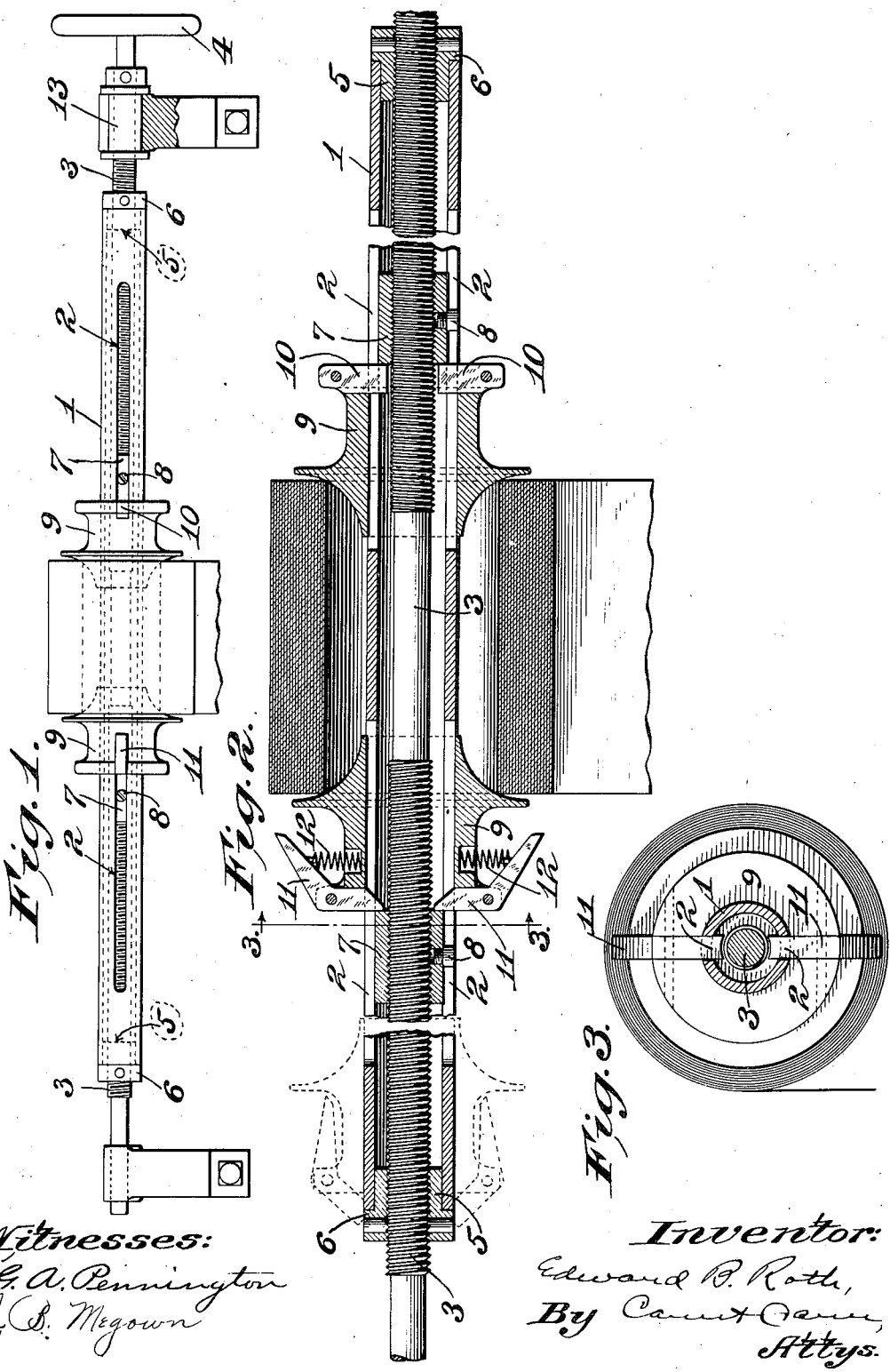
Witnesses:
G. A. Pennington
J. S. Megown
Inventor:
Edward B. Roth,
By Caun+Caun,
Attys.

UNITED STATES PATENT OFFICE.

EDWARD B. ROTH, OF ST. LOUIS, MISSOURI, ASSIGNOR TO B. ROTH TOOL COMPANY, OF ST. LOUIS, MISSOURI, A CORPORATION OF MISSOURI.

DEVICE FOR POSITIONING ROLLS.

No. 862,109.　　　　Specification of Letters Patent.　　　　Patented July 30, 1907.

Application filed August 10, 1906. Serial No. 330,070.

*To all whom it may concern:*

Be it known that I, EDWARD B. ROTH, a citizen of the United States, and a resident of the city of St. Louis and State of Missouri, have invented a new and useful Improvement in Devices for Positioning Rolls, of which the following is a specification.

My invention relates to a device for positioning rolls and more particularly for positioning rolls of paper used in printing.

It consists principally in a hollow shaft slotted lengthwise and containing a right and left hand screw upon which work nuts arranged to coöperate with core hubs mounted upon said spindle.

It also consists in the parts and in the arrangements and combinations of parts hereinafter described and claimed.

In the accompanying drawing, which forms part of this specification, and wherein like symbols refer to like parts wherever they occur, Figure 1 is an elevation of my device mounted in suitable bearings; Fig. 2 is an enlarged longitudinal sectional view thereof with portions broken away; and, Fig. 3 is a vertical cross-section on the line 3—3 of Fig. 2.

The spindle or axle 1 is hollow or tubular and has an elongated slot or slots 2 arranged longitudinally thereof. Extending lengthwise through the spindle is a threaded rod 3 which is provided with a hand wheel 4 at its end. One end of this threaded rod is provided with a right-hand screw thread and the other is provided with a left-hand screw thread. At each end of the spindle, the threaded rod has a fixed sleeve 5 which fits rotatably inside of the end of said spindle. Each of the fixed sleeves 5 has a shoulder or annular enlargement 6 which constitutes an abutment or limiting piece for the spindle and prevents endwise movement thereof. Inside of the spindle are two threaded sleeves or nuts 7, one of which works on the left-handed thread of the screw rod and the other of which works on the right-handed thread. Each of these sleeves or nuts is provided with a screw or other projecting piece 8 adapted to slide in the elongated slot of the spindle. Fitting over said spindle so as to slide thereon are two core hubs 9, the adjacent faces of said core hubs being of conical form to facilitate entering and fitting into the hollow of the rolls. Said hubs are provided with members 10, 11 adapted to enter the elongated slot and engage or interlock with the sleeve. As shown in the drawing, the member 10 of one of the hubs is fixed, but the member or members 11 of the other hub are bent levers pivotally mounted on the hub. One end of the bent lever 11 is pressed outwardly from the hub by means of the spring 12, in which position, the inner end of the bent lever is in its innermost position. The inner end of the bent lever is beveled off, so that, when the outer end of said bent lever is pressed inwardly against its spring, the entire inner end of the bent lever will clear the elongated slot of the spindle. By this arrangement, the bent lever constitutes a trigger and furnishes a convenient means for locking the hub in place and for disengaging it from the spindle so as to replace the roll. Normally the threaded rod turns with the spindle, but is capable, when said spindle is held stationary, of being turned separately therefrom to position the core hubs.

In practice the threaded rod is provided with a fixed flanged sleeve or spool 13 adapted to fit in suitable journal bearings for effecting endwise movement therein; in other words, the bearing piece or spool constitutes also the means for positioning the spindle longitudinally wherever it may be desired to mount the same.

The parts being properly assembled, the projections 10 and 11 from the core hubs extend into the elongated slots to engage the ends of the threaded sleeves 8. When the hand wheel on the end of the threaded rod is turned, and the tubular spindle member 1 is held stationary the threaded sleeves, being prevented from turning by the engagement of their shoulders with the walls of the slots, are moved lengthwise of the spindle thereby pushing their respective core hubs towards each other. The threads of the rod being of equal pitch, the sleeves move equal distances in opposite directions, so that the point midway between them in one position is likewise midway between them in all other positions. In consequence of this arrangement, the middle line of a roll of paper mounted on the core hubs is the same regardless of the width of the roll. Consequently, when the several parts of the device are once properly positioned, there will be no occasion for any other adjustment than to insert and clamp the particular roll between the core hubs. The manner of replacing one roll with another is to remove one of the core hubs by pressing its triggers to disengage them from the threaded sleeve and the elongated slot and then slip them endwise from the spindle. The roll of paper is then removed and replaced with another roll, whereupon the core hub is again set in position with its trigger interlocking with the shoulder or end of the threaded sleeve, whereupon the hand wheel is turned to move the core hubs towards each other and clamp the roll in position.

Obviously, my device is capable of considerable modification within the scope of my invention and, therefore, I do not wish to be limited to the specific construction shown and described. For instance, the device may be used for mounting the feed roll of the printing press or in other relations.

What I claim as my invention and desire to secure by Letters Patent is:

1. A spindle having core hubs slidingly mounted thereon and means common to said hubs for positioning said hubs simultaneously.

2. A hollow spindle having core hubs slidingly mounted thereon and means common to said hubs for simultaneously moving said hubs equal distances towards a given point.

3. A hollow spindle having core hubs slidingly mounted thereon and means common to said core hubs for moving them simultaneously, said means comprising members arranged to be moved endwise of the spindle simultaneously at equal rates of travel.

4. A hollow spindle having elongated slots therein, a right and left threaded rod rotatably mounted in said spindle, threaded sleeves on said rod, and core hubs simultaneously mounted on said spindle and having engagement with said sleeves.

5. A hollow spindle having elongated slots therein, a right and left threaded rod rotatably mounted in said spindle but secured against endwise movement relative thereto, threaded sleeves on said rod, and core hubs slidingly mounted on said spindle and having engagement with said sleeves.

6. A hollow spindle having elongated slots therein, a right and left threaded rod rotatably mounted in said spindle, threaded sleeves on said rod, and core hubs slidingly mounted on said spindle and having engagement with said sleeves, the engaging members of one of said core hubs being releasably engaged.

7. A hollow spindle having elongated slots therein, a right and left threaded rod rotatably mounted in said spindle, threaded sleeves on said rod, and core hubs slidingly mounted on said spindle and having engagement with said sleeves, the engaging member of one of said core hubs being a bent lever whose outer end is in position for convenient manipulation to disengage its inner end from the corresponding sleeve.

8. A hollow spindle having elongated slots therein, a right and left threaded rod rotatably mounted in said spindle, threaded sleeves on said rod, and core hubs slidingly mounted on said spindle, and having engagement with said sleeves, the engaging member of one of said core hubs being a spring actuated bent lever whose outer end is in position for convenient manipulation to disengage its inner end from the corresponding sleeve.

In testimony whereof I have signed my name to this specification in the presence of two subscribing witnesses, this 7th day of August, 1906, at St. Louis, Missouri.

EDWARD B. ROTH.

Witnesses:
J. B. MEGOWN,
G. A. PENNINGTON.